(12) United States Patent
Vengrinovich et al.

(10) Patent No.: US 7,616,729 B2
(45) Date of Patent: Nov. 10, 2009

(54) METHOD FOR PRODUCING X-RAY COMPUTER TOMOGRAPHY IMAGES FROM LIMITED DATA OF AN IMAGE OBJECT

(75) Inventors: Valeriy Vengrinovich, Minsk (BY); Yuri Denkevich, Minsk (BY); Wolfgang Schlegel, Heidelberg (DE); Bernd Hesse, Mossautal (DE)

(73) Assignee: Deutsches Krebsforschungszentrum, Heidelberg (DE)

( * ) Notice: Subject to any disclaimer, the term of this patent is extended or adjusted under 35 U.S.C. 154(b) by 309 days.

(21) Appl. No.: 11/632,724

(22) PCT Filed: Jul. 15, 2005

(86) PCT No.: PCT/EP2005/007734

§ 371 (c)(1),
(2), (4) Date: Jun. 27, 2007

(87) PCT Pub. No.: WO2006/008089

PCT Pub. Date: Jan. 26, 2006

(65) Prior Publication Data

US 2007/0242796 A1    Oct. 18, 2007

(30) Foreign Application Priority Data

Jul. 19, 2004    (EP) .................... 04016967

(51) Int. Cl.
*A61B 6/03* (2006.01)
(52) U.S. Cl. .............. 378/4; 378/65; 378/901; 382/131
(58) Field of Classification Search .......... 378/4, 378/65, 901; 382/128–131
See application file for complete search history.

(56) References Cited

U.S. PATENT DOCUMENTS

| 5,233,990 A | 8/1993 | Barnea | |
|---|---|---|---|
| 2004/0254448 A1* | 12/2004 | Amies et al. | 600/410 |
| 2007/0217568 A1* | 9/2007 | Edic et al. | 378/4 |

FOREIGN PATENT DOCUMENTS

WO    WO-03/076016 A1    9/2003

OTHER PUBLICATIONS

Vengrinovich et al., Reconstruction of three-dimensional binary structures from an extremely limited number of cone-beam x-ray projections. Choice of prior, 1999, Journal of Physic D: Applied Physics, vol. 32, pp. 2505-2514.*
Brock et al., Automated generation of a four-dimensional model of the liver using warping and mutual information, 2003, Medical Physics, vol. 30, No. 6, pp. 1128-1133.*
Park, Adaptive Registration and Atlas Based Segmentation, 2003, Doctoral Thesis, University of Michigan.*
Partridge et al., IMRT verification by three-dimensional dose reconstruction from portal beam measurements, 2002, Medical Physics, vol. 29, No. 8, pp. 1847-1858.*
Fornefett et al., Radial basis functions with compact support for elastic registration of medical images, 2001, Image and Vision Computing, vol. 19, pp. 87-96.*
Yan et al., Adaptive radiation therapy, 1997, Physics in Medicine and Biology, vol. 42, pp. 123-132.*
Penney et al., Proceedings of the SPIE—The International Society for Optical Engineering SPIE—Int. Soc. Opt.Eng, USA, vol. 3979, Feb. 14, 2000, pp. 482-492.
Bansal et al., Medical Image Computing and Computer-Assisted Intervention—MCAI '98. First International Conference, Proceedings Springer-Verlag Berling, Germany, Oct. 11, 1998, pp. 1075-1086.
Clarkson et al., Proceedings of the SPIE—The International Society for Optical Engineering SPIE—Int. Soc. Opt. Eng USA, vol. 3979, Feb. 14, 2000, pp. 342-352.

* cited by examiner

*Primary Examiner*—Edward J Glick
*Assistant Examiner*—John M Corbett
(74) *Attorney, Agent, or Firm*—Birch, Stewart, Kolasch & Birch, LLP

(57) ABSTRACT

The invention relates to a method for producing computer tomography images from limited data of a region of interest of an image object which can be subject to changes, comprising the steps of a) producing a first computer tomography image of the region of interest (source image) by acquiring a sufficient set of projection data and using a standard CT-image reconstruction technique, b) selecting at least one transformation function depending on expected changes of the image object, c) acquiring CT-data of the image object from a limited number of projections under a limited range of observation angles, d) reconstructing a new image of the region of interest (target image) by an iterative procedure starting from the source image of the region of interest, deforming the source image by using the transformation function and optimizing the target image in view of the acquired CT-data from the limited number of projections.

9 Claims, 3 Drawing Sheets

METHOD FOR PRODUCING X-RAY COMPUTER TOMOGRAPHY IMAGES FROM LIMITED DATA OF AN IMAGE OBJECT

FIELD OF THE INVENTION

The present invention is directed to a method for producing x-ray computer tomography (CT) images from a limited set of computer tomography data.

BACKGROUND OF THE INVENTION

In the current state of computer technology, image reconstruction has a wide spread use. This is particularly true for medical-diagnostic imaging, for example by computer tomography (CT). Computer tomography is also utilized for the non-destructive testing of materials, for example in the automotive industry.

In a computer tomography system, an X-ray source is collimated to form a fan beam with a defined fan beam angle and fan beam width. The fan beam is oriented to lie within the X-Y plane of a Cartesian coordinate system, termed the "imaging plane", and to be transmitted through an imaged object to an X-ray detector array oriented within the imaging plane. The detector array is comprised of detector elements, which each measure the intensity of transmitted radiation along a ray projected from the X-ray source to that particular detector element. The intensity of transmitted radiation received by each detector element in the detector array is dependent on the attenuation of the X-ray beam along a ray by the imaged object. Each detector element produces an intensity signal dependent on the intensity of transmitted radiation stirring the detector element. The X-ray source and detector array may be rotated on a gantry within the imaging plane so that the fan beam intercepts the imaged object at different angles. At each angle, a projection is acquired, comprised of the intensity signals of each of the detector elements. The projection at each of these different angles together form a tomographic projection set. Normally a projection set will be taken over 360° of gantry rotation. An attempt to reconstruct an image with less than a complete projection set will normally lead to image artifacts caused by the missing data and image blurring.

In many practical applications a free access to an image object by an X-ray acquisition system in order to acquire a complete projection set is not possible due to a limited time for data acquisition or the limited spatial accessibility of the image object.

One example is verification imaging in radiation therapy. The main object of radiotherapy is to deliver the prescribed dosage of radiation to a tumor in a patient while minimizing the damage to surrounding, healthy tissue. Since very high energy radiation is normally used to destroy tumors in radiotherapy, the high energy is also destructive to the normal tissue surrounding the tumor. Therefore, it is essential that the delivery of radiation be limited precisely to the prescribed target volume (i.e. the tumor plus adequate margins). The main sources of the problem result from the fact that there is a natural motion of organs inside the body, which can range from approximately a millimetre in the case of the brain inside the skull to several centimetres for the organs in the trunk. Another factor relates to changes which occur in the tumor over time as a result of successful treatment. As the tumor shrinks in volume, normal tissue which had been displaced returns to its original position within the treatment volume. Furthermore, patient movement can be another reason for positioning errors during irradiation. To accurately verify tumor positioning, one method taught in the prior art is to utilize a low dose, low energy X-ray source in conjunction with the therapy beam source.

U.S. Pat. No. 5,233,990 A relates to a method for producing corrected verification images of anatomical portions of a patient being treated with conventional radiation therapy equipment consisting of a gantry having a high-energy radiation source capable of emitting a high-energy radiation beam along a high energy beam axis, said gantry being disposed for irradiation of a stationary patient positioned on a gurney at a fixed distance from the high-energy radiation source. The method comprises the steps of providing a low-energy radiation source mounted on a side of the gantry opposite to the high-energy radiation source, said low-energy radiation source being capable of emitting a low-energy radiation beam along a low-energy beam axis coaxial with the axis of the beam from the high-energy radiation source;

providing a radiation detector mounted between the high-energy radiation source and the patient's gurney, said detector being positioned so that it can be exposed to both the high-energy beam and the low-energy beam;

irradiating the patient with said coaxial low-energy radiation source during treatment to form verification images on said radiation detector and comparing the verification images with the diagnostic images during treatment to ensure that the anatomical portions of the patient being irradiated by high-energy radiation treatment correspond to the anatomical portions delineated on the diagnostic images.

WO 03/076016 A1 is directed to a device for performing and verifying therapeutic radiation. An X-ray is arranged across from a target volume of the beam source for a high-energy beam in such a way that the beams run in essentially opposite directions. The invention also relates to a computer program and a control method for operating said device. The inventive device makes it possible to exactly verify areas that are subjected to different levels of radiation, the entire anatomy of the target volume and the surroundings thereof in addition to the contour of the therapy beam. The X-ray detects the anatomy and position of the patient within the range of the target volume before the high-energy beam is applied and then detects the shape of the applied high-energy beam and areas that are subjected to different levels of radiation as well as at least one partial segment of the target volume during the emission breaks of the high-energy beam. The detected data is used for correcting the treatment plan.

The prior art systems for radiation therapy contain a limited accessible space for the placement of the verification imaging equipment. Furthermore, there is little time during the emission breaks of the therapy beam to collect data for the verification imaging. Therefore no complete data sets can be acquired. With an incomplete data set, an image reconstruction with reasonable quality is not possible using conventional image reconstruction techniques.

DESCRIPTION OF THE PRIOR ART

In prior art, CT-images are either reconstructed analytically or iteratively.

One example for a standard analytic method is filtered back projection. Image reconstruction is accomplished by a projection reconstruction algorithm, where the projection measurements are filtered by an appropriate convolution kernel and then back projected. For this method the complete data set is required. 3D-medical imaging using the method of filtered back projection of multi-phase objects with an incomplete data set yields artifacts and image blurring.

A statistical iterative method that has improved performance in many tomography problems is the method of Bayesian image reconstruction, i.e. Maximum Likelihood methods, updated with an appropriate prior knowledge. The Bayesian approach provides the means to incorporate prior knowledge in data analysis. Bayesian analysis revolves around the posterior probability, which summarizes the degree of one's certainty concerning a given situation. Bayes's law states that the posterior probability is proportional to the product of the likelihood and the prior probability. The likelihood encompasses the information contained in the new data. The prior expresses the degree of certainty concerning the situation before the data is taken. This prior art reconstruction technique is also not suitable for a satisfactory image reconstruction from the limited data, particularly a limited observation angle.

SUMMARY OF THE INVENTION

An object of the present invention is to provide a method for 3D-image reconstruction from limited CT-data.

Another object of the present invention is to provide a method for on-line 3D-image reconstruction during a radiation therapy session from a limited set of X-ray projections, made within a limited observation angle, allowing the recognition of changes of the image object during the session.

These objects are achieved in accordance with the principles of the present invention in a method for producing computer tomography images from limited data of a region of interest of an image object, which can be subject to changes, comprising the steps of a) producing a first computer tomography image of the region of interest (source image) by acquiring a sufficient set of projection data and using a standard CT-image reconstruction technique, b) selecting at least one transformation function depending on expected changes of the image object, c) acquiring CT-data of the image object from a limited number of projections under a limited range of observation angles, d) reconstructing a new image of the region of interest (target image) by an iterative procedure starting from the source image of the region of interest, deforming the source image by using the transformation function and optimizing the target image in view of the acquired CT-data from the limited number of projections.

This method is using the preliminary first CT-image (source image) as a reference and algorithms for image deformation in compliance with the limited data for the reconstruction of the new image (target image), the algorithms being selected according to expected image changes.

In step a) of the method according to the present invention, a source image of the region of interest is reconstructed from CT-data using a standard CT image reconstruction technique, like filtered back projection or the method of Bayesian image reconstruction. In the context of the application the region of interest can be a 2D-region or a 3D-volume of interest. The source image is reconstructed from a sufficient set of projection data, which allows reconstructing the source image substantially without artifacts.

In step b) of the method according to the present invention, a transformation function or a combination of transformation functions is selected, which is able to transform the source image into the target image. The transformation function is chosen depending on expected changes of the image object.

The matching transformation function for each different image object with different possible changes has to be investigated once and can be selected for similar image objects every time the method according to the invention is used.

In step c) an incomplete CT-data set of the image object is acquired, which would not be sufficient for image reconstruction with reasonable quality using for example conventional back projection techniques. The observation angle is the angle of the X-ray source, rotating around a rotation axis which crosses the image object, under which the data from a CT-projection is acquired.

In step d) of the method according to the invention, the target image of the image object, which has possibly undergone a change since the source image has been produced, is reconstructed in an iterative optimization procedure under the constraint of preserving the characteristic morphology of the source image to a large extent. The number of iterations depends on the robustness to noise of the selected algorithm. For the reconstruction of the target image, the transformation function is used, deforming the source image. The target image is optimized in view of the limited CT-data acquired in step c).

In a preferred embodiment of the present invention the selected transformation function is based upon a basis function. For the reconstruction of an X-ray attenuation map, the voxel representation of an unknown map of attenuation coefficients (target image) is used.

A voxel is a 3-dimensional pixel (a volume pixel), a small box-shaped part of a 3-dimensional space.

The unknown spatial distribution of attenuation coefficients, $\mu(\vec{r})$, in a continuous form, (target image) can be represented as follows:

$$\mu(\vec{r}) = \mu^{CT}(\vec{r}\,'); \vec{r}\,' = f(\vec{r}), \qquad (I)$$

where $\vec{r} = (x,y,z)$, $\vec{r}\,' = (x', y', z')$—radius—vectors;

$\mu^{CT}(\vec{r})$—known continuous distribution of attenuation coefficients, taken e.g., from a CT image with the help of interpolation of discrete values (source image);

$f(\vec{r})$—unknown transformation function.

While the transformation function $f(\vec{r})$ is found, the discrete values (target image) can be calculated with the help of eq. (I) as the values of function $\mu(\vec{r})$ in the points, which correspond to the pixel centers.

In the general case the transformation function $f(\vec{r})$ is represented with the help of basis functions as follows:

$$f(\vec{r}) = \sum_{i=0}^{l} \sum_{j=0}^{m} \sum_{k=0}^{n} \vec{p}^{\,ijk} \varphi_{ijk}(\vec{r}), \qquad (II)$$

where $\{\varphi_{ijk}(\vec{r})\}$–$(l+1)\times(m+1)\times(n+1)$ given basis functions, $\{\vec{p}_{ijk} = (p_x^{ijk}, p_y^{ijk}, p_z^{ijk})\}$–$3\times(l+1)\times(m+1)\times(n+1)$ unknown coefficients.

The basis functions can be selected from the group of common polynomial, Bernstein polynomial, tri-linear interpolator, 3D cubic spline, 3D thin-plate and others. These basis functions are:

1. Common polynomial $$\phi_{ijk}(\vec{r}) = \phi_{ijk}(x,y,z) = x^i y^j z^k, (i,j,k) \in [0,l] \otimes [0,m] \otimes [0,n]. \quad (III)$$

2. Bernstein polynomials $$\varphi_{ijk}(\vec{r}) = \varphi_{ijk}(x, y, z) = B_i^l\left(\frac{x-x_0}{\Delta x}\right) B_j^m\left(\frac{y-y_0}{\Delta y}\right) B_k^n\left(\frac{z-z_0}{\Delta z}\right), \quad (IV)$$

$$B_g^h(t) = \binom{h}{g} t^g (1-t)^{h-g},$$

$$\vec{r} \in [x_0, x_0 + \Delta x] \otimes [y_0, y_0 + \Delta y] \otimes [z_0, z_0 + \Delta z],$$

$$(i, j, k) \in [0, l] \otimes [0, m] \otimes [0, n].$$

3. Tri-linear interpolator $$\varphi_{ijk}(\vec{r}) = \varphi_{ijk}(x, y, z) \quad (V)$$
$$= \left|\frac{(x-x_0)l}{\Delta x} - i\right| \cdot \left|\frac{(y-y_0)m}{\Delta y} - j\right| \cdot \left|\frac{(z-z_0)n}{\Delta z} - k\right|,$$

$$x \in \left[x_0 + \frac{i-1}{l}\Delta x, x_0 + \frac{i+1}{l}\Delta x\right],$$

$$y \in \left[y_0 + \frac{j-1}{m}\Delta y, y_0 + \frac{j+1}{m}\Delta y\right],$$

$$z \in \left[z_0 + \frac{k-1}{n}\Delta z, z_0 + \frac{k+1}{n}\Delta z\right],$$

$$(i, j, k) \in [0, l] \otimes [0, m] \otimes [0, n].$$

4. 3D cubic spline $$\phi_{ijk}(\vec{r}) = s(\vec{r}^{ijk} - \vec{r}), (i,j,k) \in [0,l] \otimes [0,m] \otimes [0,n], \quad (VI)$$

where $s(\vec{r}^{ijk} - \vec{r})$—3D cubic spline, constructed for control points $\{\vec{r}^{ijk}, (i,j,k) \in [0,l] \otimes [0,m] \otimes [0,n]\}$.

Particularly, if for $\forall (i,j,k)\ \vec{p}^{ijk} = \vec{r}^{ijk}$, then $f(\vec{r}) \equiv \vec{r}$.

5. 3D thin-plate spline $$\phi_{ijk}(\vec{r}) = U(|\vec{r}^{ijk} - \vec{r}|), (i,j,k) \in [0,l] \otimes [0,m] \otimes [0,n], \quad (VII)$$

where $U(|\vec{r}^{ijk} - \vec{r}|)$—3D thin-plate spline, constructed for control points $\{\vec{r}^{ijk}, (i,j,k) \in [0,l] \otimes [0,m] \otimes [0,n]\}$. Particularly if for $\forall (i,j,k)\ \vec{p}^{ijk} = \vec{r}^{ijk}$, then $f(\vec{r}) \equiv \vec{r}$.

After a choice of a basis function, the approximate value $\vec{\lambda}$ for the vector of unknown variables $\vec{\lambda} = (p_x^{000}, p_y^{000}, p_z^{000}, \ldots, p_x^{lmn}, p_y^{lmn}, p_z^{lmn})$ in the eq. (II) can be obtained by solving the following optimization problem:

$$\begin{cases} \vec{\tilde{\lambda}} = \mathrm{argmin}[\ln L(\vec{P}, \hat{P}\mu) + \alpha(\delta) B(\vec{\lambda})] \\ \ln L(\vec{P}, \hat{P}\mu) = \delta, \end{cases} \quad (VIII)$$

where $L(\vec{P}, \hat{P}, \mu)$—the Likelihood Function, which is defined basing on the selected statistical model of the measuring process (e.g., $\chi^2$-distribution or Poisson's distribution);

$\vec{P} = (P_0, P, \ldots)$—vector of measurement results;

$\mu = \mu(\vec{r})$—distribution of attenuation coefficients $\mu(\vec{r})$, depending on a vector of unknown variables $\vec{\lambda}$ in the compliance with the formulas (I) and (II);

$\hat{P}$—projecting operator, which is defined by the acquisition geometry;

$B(\vec{\lambda})$—functional, which allows to consider an additional (a priori) information on the possible solution (e.g. smoothness or the attribute to a given region, etc.);

$\alpha(\delta)$—regularization parameter, depending upon the measurement error $\delta$.

The projecting operator $\hat{P}$ in the (VIII) helps to estimate the measurement result $(\hat{P}\mu)$ with the subscript i at a given distribution $\mu = \mu(\vec{r})$, and is defined with the help of the following expressions:

$$(\hat{P}\mu)_i = \int_{L_i} \mu(\vec{r}) dl \approx \sum_j l_{ij} \mu_j, \quad (IX)$$

where $L_i$ is a cut, connecting an x-ray source and a detector in a point i;

values $\{\mu_j = \mu(\vec{r}_j)\}$ of the function $\mu(\vec{r})$ in the control points $\{\vec{r}_j\}$ and coefficients $\{l_{ij}\}$ represent the discrete approximation of the integral in (IX).

A search for the unknown solution of the problem (VIII) can be implemented by using the method of successive approximations and includes the following steps:

a) choice of an initial approximation $\vec{\lambda}^{(0)}$ from the condition: $f(\vec{\lambda}^{(0)}, \vec{r}) = \vec{r}$.

b) Calculation of the (k+1)-th approximation $\vec{\lambda}^{(k+1)}$ with the help of the formula:

$$\vec{\lambda}^{(k+1)} = \vec{\lambda}^{(k)} + \beta_k \frac{\partial}{\partial \vec{\lambda}}\left(\ln L(\vec{P}, \hat{P}\mu) + \alpha B(\vec{\lambda})\right)\Big|_{\vec{\lambda} = \vec{\lambda}^{(k)}},$$

where $\vec{\lambda}^{(k)}$—k-th approximation.

The parameter $\beta_k$ is determined in compliance with the steepest descent method.

c) The iterative process is stopped, if the number of iterations reached a given value or the following condition is performed:

$$(\ln L(\vec{P}, \hat{P}\mu) + \alpha B(\vec{\lambda}))|_{\vec{\lambda} = \vec{\lambda}^{(k)}} \leq \partial.$$

The regularization parameter $\alpha$ for the particular acquisition system can be calculated preliminary by fitting or iteration.

In a preferred embodiment of the present invention, the observation angles in step c) are chosen from a range of 0° to 90° about a rotation axis which crosses the region of interest of the image object. The necessary range of observation angles depends on the complexity of the image to be reconstructed. It can be smaller than 90°, in some applications even smaller than 30°.

Furthermore, a limited number of projections is detected within this range of observation angles, this number being also depending upon the complexity of the image to be reconstructed. For the reconstruction of images of the human body, a much smaller number is sufficient than the number of projections for a complete regular CT—data set (by up to 1 or 2 orders of magnitude).

The possible changes, on which the selection of the transformation function in step b) of the method according to the present invention depends, may be at least one of the group of changes in position, shape, size and orientation.

According to a preferred embodiment of the present invention, the target image is reconstructed for an on-line verification during a radiation therapy of a patient with a high energy therapy beam. Preferably steps c) and d) are repeated during the radiation therapy, acquiring the CT-data from the limited number of projections during emission breaks of the high-energy therapy beam. If steps c) and d) are repeated, the last target image can be used instead of the source image for the reconstruction of the new target image. When the method according to the present invention is used for verification during a radiation therapy, the image object can be an organ of the patient and the region of interest can be a tumor in the organ and the tumor's surroundings. In this case, the transformation function can be selected depending on the organ having a tumor and the possible changes of the tumor for example as a result of the organ moving within the body of the patient. All organs of the human body can be classified as to their expected changes and mobility during a radiation therapy session (local or global changes). In its turn this main property defines the respective image reconstruction algorithm. An example for a possible classification of organs is given in the following table:

| Organ | Basis function |
| --- | --- |
| Skull, lungs | Common polynomial, Bernstein polynomial |
| Prostate | 3D thin-plate spline, cubic spline |
| Thorax | Bernstein polynomial |
| Rectum | Tri-linear interpolator |

According to a preferred embodiment of the present invention, the CT-data from a limited number of projections in step c) is acquired by moving a radiation source emitting X-rays on a circle or a straight line in a plane, which is situated perpendicularly to the high energy therapy beam on one side of the image object, and detecting a number of projections of the region of interest with the aid of a detector on the other side of the image object.

A device, which can be used for detecting the projections, can be constructed in the same way as the device for performing and verifying a therapeutic treatment, which is disclosed in WO 03/076016 A1.

The reconstructed target image of the region of interest can be used during the radiation therapy for correcting the treatment plan for the radiation therapy of the patient or even for stopping the therapy, if the positioning of the therapy beam cannot be adapted to a detected change of the image object to be treated. For example if the patient moves, the target image will reveal a change in the area being radiated compared to the source image, so that immediate steps can be taken to minimize any localization error. Therefore, this invention is suitable for on-line, real-time application, which renders it particularly valuable for radiation therapy.

The Shepp-Logan phantom is an analytic phantom used in tomographic application due to the simple expression of its Fourier transform. The phantom consists of ellipses resembling the human brain features and the cranial contour. This phantom head is well known because of its use in testing the accuracy of reconstruction algorithms with regard to their ability to reconstruct cross-sections of the human head with X-ray tomography.

Figure 1:
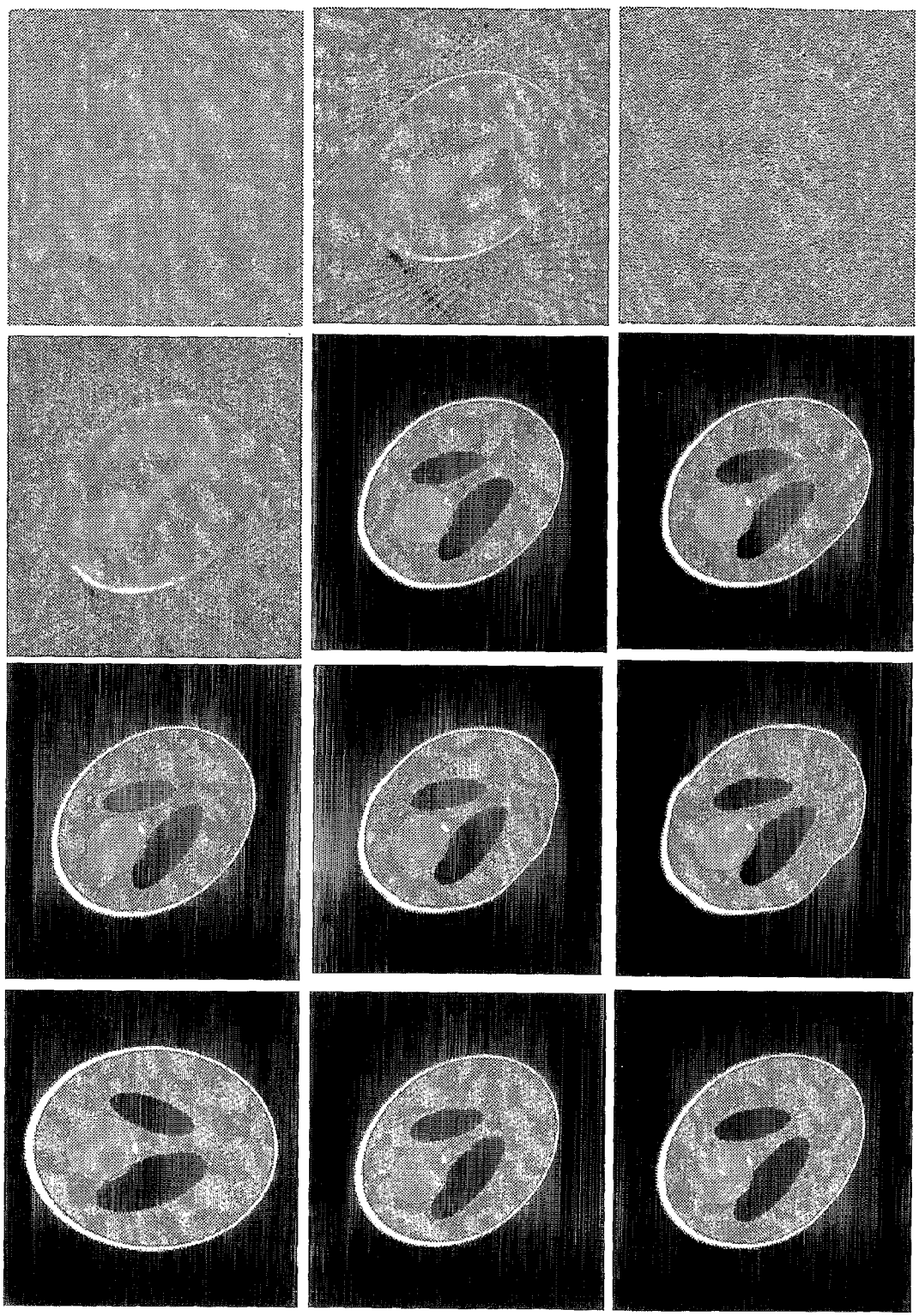
FIG. 1 shows 2D-target images reconstructed by different reconstruction algorithms, using a Shepp-Logan phantom as a source image being reconstructed after its rotation, with and without noise being imposed on the projection used for reconstruction.

In FIG. 1, line 1, column 1, a 2D-image of the central cross-section of a Shepp-Logan phantom is presented. After rotation of this phantom as shown in FIG. 1, line 1, column 2, the changed phantom was "irradiated" with X-rays, taking 20 projections of it within an observation angle range of 0° to 90°. Using this limited data of the 20 projections, the rotated phantom was reconstructed using prior art reconstruction methods and the method according to the present invention with different transformation functions.

Line 2, column 4, shows the result of filtered back projection. The image contains artifacts and is blurred. Accuracy of the construction can only be improved with more projections. This state of the art reconstruction method is thus not suitable for image reconstructions using limited projection data under a limited range of observation angles. The reconstruction result applying filtered back projections is even worse, when white Gausian noise with a mean value of 40% of the maximum of the projected grey level is imposed on each projection before image reconstruction, as can be seen in line 3, column 4 of FIG. 1.

The result of image reconstruction from the data of 20 projections using the prior art method of Maximum Likelihood also does not lead to satisfying results (line 1, column 3—without noise, line 1, column 4—with noise).

For the method according to the present invention, the original Shepp-Logan phantom as shown in line 1, column 1, was used as the source image. The selected transformation functions were based on the basis functions Bernstein Polynomials, bi-linear interpolation and cubic spline. With the data of the 20 projections, the image of the rotated phantom was reconstructed with or without imposed noise (Bernstein Polynomials—line 2, column 1 and line 3, column 1; bi-linear interpolation—line 2, column 2 and line 3, column 2; cubic spline—line 2, column 3 and line 3, column 3). The reconstructed images using the method according to the present invention are of a much higher quality than the reconstructed images using prior art methods, with small differences resulting from the different selected transformation functions.

Figure 2:
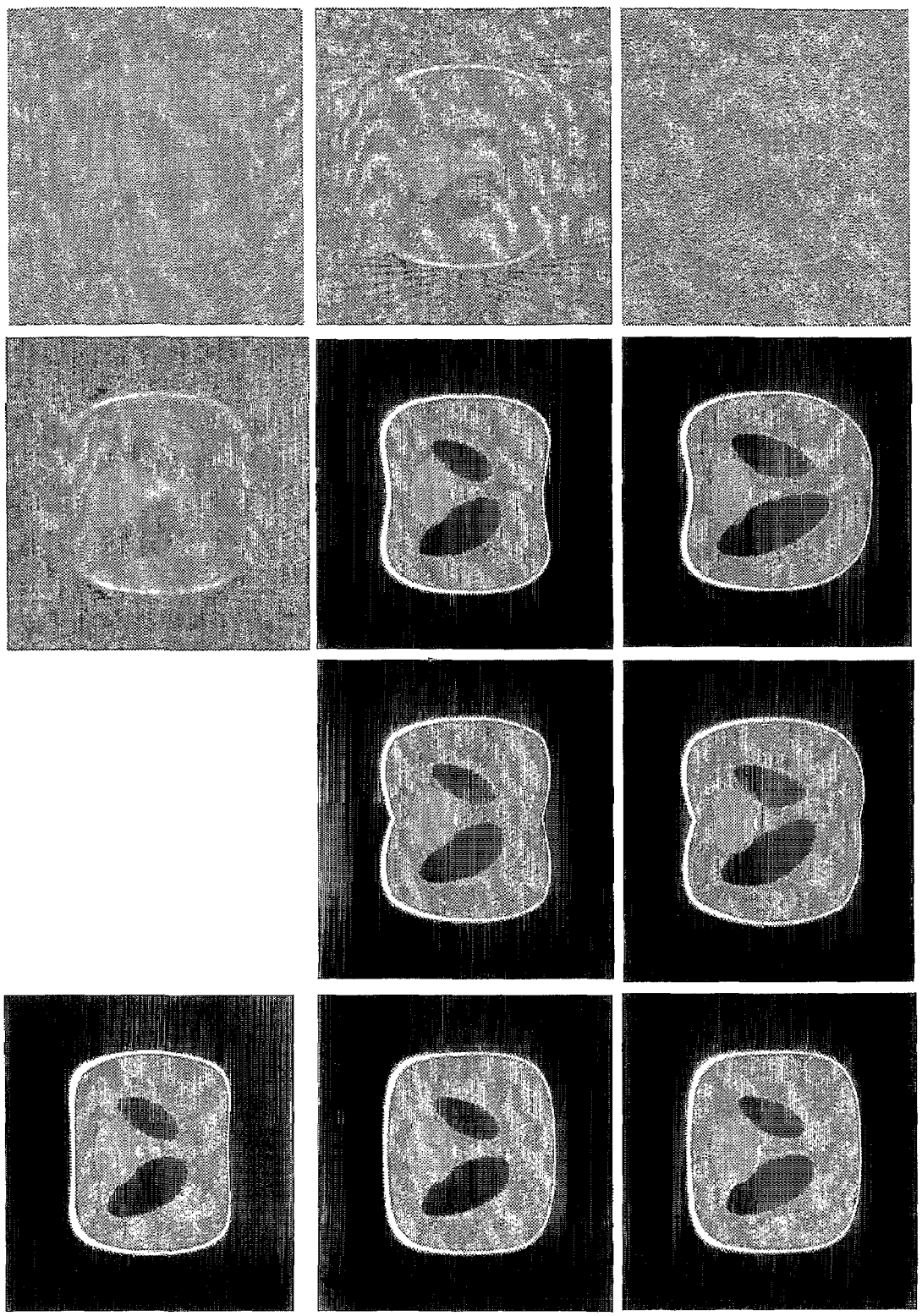
FIG. 2 shows 2D-target images reconstructed by different reconstruction algorithms, using a Shepp-Logan phantom as a source image being reconstructed after its vertical shrinkage, with and without noise being imposed on the projections used for reconstruction.

The same result can be shown for a Shepp-Logan phantom that has vertically shrinked, as presented in FIG. 2, line 1, column 1. In this Fig. the images were reconstructed starting with data of 20 projections applying the following algorithms with and without noise:

line 1, column 3 and line 1, column 4: Maximum Likelihood (state of the art), line 2, column 4 and line 3, column 4: filtered back projections (state of the art), line 2, column 1 and line 3, column 1: Bernstein Polynomials (present invention method), line 2, column 2 and line 3, column 2: bi-linear interpolation (present invention method), line 2, column 3 and line 3, column 3: cubic spline (present invention method).

Figure 3:
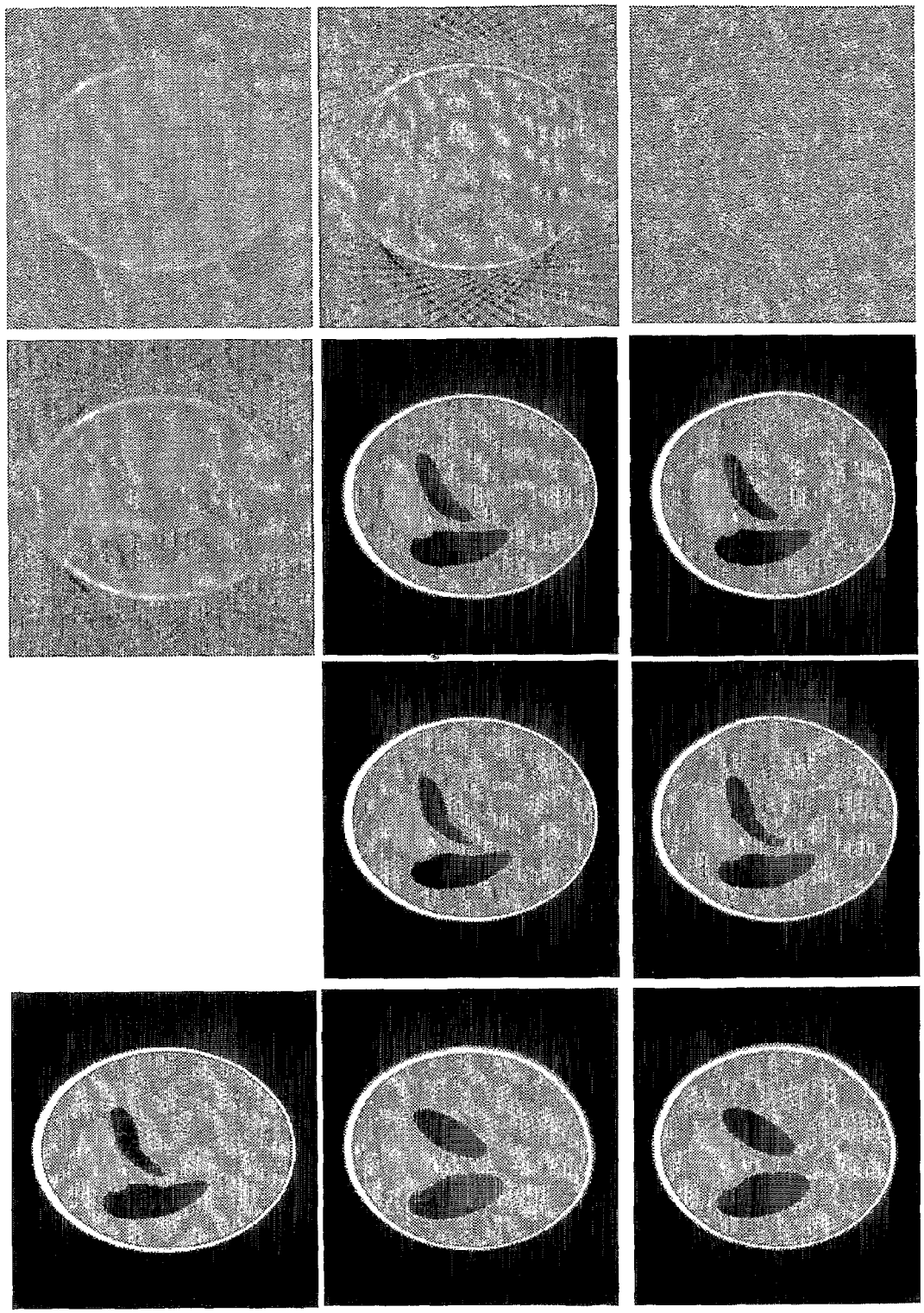
FIG. 3 shows 2D-target images reconstructed by different reconstruction algorithms, using a Shepp-Logan phantom as a source image being reconstructed after its local deformation, with and without noise being imposed in the projections used for reconstruction.

The method according to the present invention is also very suitable for the image reconstruction of the Shepp-Logan phantom after a local deformation as shown in FIG. 3, line 1, column 1. In this Fig. the images were reconstructed starting with data of 20 projections applying the following algorithms with and without noise:

line 1, column 3 and line 1, column 4: Maximum Likelihood (state of the art), line 2, column 4 and line 3, column 4: filtered back projections (state of the art), line 2, column 1 and line 3, column 1: Bernstein Polynomials (present invention method), line 2, column 2 and line 3, column 2: bi-linear interpolation (present invention method), line 2, column 3 and line 3, column 3: cubic spline (present invention method).

The considered reconstruction results in all three cases of a changed image object illustrate substantial capability of the proposed fast image reconstruction techniques based on image deformation, if a source image, given by a preliminary CT-session, is available.

The invention claimed is:

1. Method for producing computer tomography images from limited data of a region of interest of an image object which can be subject to changes, comprising the steps of
   a) producing a first computer tomography image of the region of interest (source image) by acquiring a sufficient set of projection data and using a standard CT-image reconstruction technique,
   b) selecting at least one transformation function depending on expected changes of the image object,
   c) acquiring CT-data of the image object from a limited number of projections under a limited range of observation angles,
   d) reconstructing a new image of the region of interest (target image) by an iterative procedure starting from the source image of the region of interest, deforming the source image by using the transformation function and optimizing the target image in view of the acquired CT-data from the limited number of projections.

2. Method as claimed in claim 1, wherein the transformation function is based upon a basis function, the basis function being selected from the group of common polynomial, Bernstein polynomial, tri-linear interpolator, 3D cubic spline and 3D thin-plate spline.

3. Method as claimed in claim 1, the observation angles in step c) being chosen from a range of 0° to 90° about a rotation axis which crosses the region of interest of the image object.

4. Method as claimed in claim 1, the possible changes of the image object being at least one of the group of changes in position, shape, size and orientation.

5. Method as claimed in claim 1, wherein the target image is reconstructed for an on-line-verification during a radiation therapy of a patient with a high energy therapy beam.

6. Method as claimed in claim 5, wherein steps c) and d) are repeated during the radiation therapy, acquiring the CT-data from the limited number of projections during emission breaks of the high energy therapy beam.

7. Method as claimed in claim 5, the image object being an organ of the patient and the region of interest being a tumor in the organ and the tumor's surroundings.

8. Method as claimed in claim 5, wherein the CT-data from a limited number of projections in step c) is acquired by moving a radiation source emitting X-rays on a circle or on a straight line in a plane, which is situated perpendicularly to the high-energy therapy beam on one side of the image object, and detecting a number of projections of the region of interest with the aid of a detector on the other side of the image object.

9. Method as claimed in claim 5, comprising the step of
   e) using the reconstructed target image of the region of interest for correcting a treatment plan for the radiation therapy of the patient.

* * * * *